(12) United States Patent
Mrozek et al.

(10) Patent No.: US 9,748,015 B2
(45) Date of Patent: *Aug. 29, 2017

(54) DEFORMABLE POLYMER COMPOSITES WITH CONTROLLED ELECTRICAL PERFORMANCE DURING DEFORMATION THROUGH TAILORED STRAIN-DEPENDENT CONDUCTIVE FILLER CONTACT

(71) Applicant: The United States of America, as represented by Sec. of the Army, Washington, DC (US)

(72) Inventors: Randy A. Mrozek, Baltimore, MD (US); Joesph L. Lenhart, Port Deposit, MD (US); Geoffrey A. Slipher, Baltimore, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 277 days.

This patent is subject to a terminal disclaimer.

(21) Appl. No.: 14/294,252

(22) Filed: Jun. 3, 2014

(65) Prior Publication Data

US 2015/0129808 A1 May 14, 2015

Related U.S. Application Data

(60) Provisional application No. 61/903,773, filed on Nov. 13, 2013.

(51) Int. Cl.
*H01B 1/22* (2006.01)
*H01B 1/24* (2006.01)
(Continued)

(52) U.S. Cl.
CPC ............... *H01B 1/24* (2013.01); *B64D 17/02* (2013.01); *H01B 1/22* (2013.01); *H01B 3/28* (2013.01);
(Continued)

(58) Field of Classification Search
CPC ... H01B 1/00; H01B 1/20; H01B 1/22; H01B 1/24; C09D 5/24; C09J 9/02
See application file for complete search history.

(56) References Cited

U.S. PATENT DOCUMENTS 5,150,516 A 9/1992 Boero
6,787,694 B1 9/2004 Vexler et al.
(Continued)

FOREIGN PATENT DOCUMENTS

JP WO 2013022030 A1 * 2/2013 ............... C08K 3/04

OTHER PUBLICATIONS

Haines and Maasen Metallhandelsgesellschaft mbH "Low Melting Alloys based on Bismuth, Indium or Gallium" product literature webpage http://www.haines-maassen.com/en/indium_en/9-erden-en/79-nleg_en.html (2015).*

(Continued)

*Primary Examiner* — Mark Kopec
(74) *Attorney, Agent, or Firm* — Eric Brett Compton

(57) ABSTRACT

The present invention generally relates to deformable polymer composites, and more particularly to, deformable polymer composites with controlled electrical performance during deformation through tailored strain-dependent conductive filler contact. According to embodiments, a deformable elastomeric conductive material includes: an elastomeric polymer matrix; and conductive filler material uniformly dispersed in the elastomeric polymer matrix sufficient to render the material electrically or thermally conductive. The conductive filler material comprises a plurality (Continued)

of substantially non-entangled particles having an aspect ratio sufficiently large to enable the particles to substantially remain in contact and/or in close proximity with adjacent particles so as to maintain conductive pathways in the material when the material is subjected to deformation up to and exceeding 10% strain.

24 Claims, 15 Drawing Sheets

(51) Int. Cl.
H01B 3/30 (2006.01)
H01B 3/44 (2006.01)
H01B 3/40 (2006.01)
H01B 3/28 (2006.01)
H01B 3/46 (2006.01)
B64D 17/02 (2006.01)

(52) U.S. Cl.
CPC .............. H01B 3/30 (2013.01); H01B 3/305 (2013.01); H01B 3/306 (2013.01); H01B 3/40 (2013.01); H01B 3/441 (2013.01); H01B 3/442 (2013.01); H01B 3/443 (2013.01); H01B 3/445 (2013.01); H01B 3/447 (2013.01); H01B 3/46 (2013.01)

(56) References Cited

U.S. PATENT DOCUMENTS

| 2010/0116527 | A1* | 5/2010 | Khosla | H01B 1/24 174/254 |
| 2011/0096025 | A1 | 4/2011 | Slobodin et al. | |
| 2011/0256383 | A1* | 10/2011 | Cochet | C08K 3/10 428/328 |
| 2012/0251824 | A1* | 10/2012 | Hur | H01B 1/02 428/378 |
| 2012/0312102 | A1* | 12/2012 | Alvarez | E21B 33/1208 73/862.041 |
| 2013/0214214 | A1* | 8/2013 | Carnahan | H01B 1/24 252/511 |
| 2013/0251943 | A1 | 9/2013 | Pei et al. | |
| 2013/0310495 | A1* | 11/2013 | Kim | H01B 3/025 524/106 |
| 2014/0090884 | A1* | 4/2014 | Kobayashi | C08K 3/04 174/388 |
| 2014/0291589 | A1* | 10/2014 | Hata | C01B 31/02 252/511 |

OTHER PUBLICATIONS

Asbury Carbon Fiber Product Guide Sheet (asbury.com) rev Apr. 2011.*
U.S. Appl. No. 14/163,016 to Justin L. Shumaker et al. titled "Deformable Elastomeric Conductors and Differential Electronic Signal Transmission", filed Jan. 24, 2014.
U.S. Appl. No. 61/883,171 to Randy Mrozek et al. titled "Porous Polymer Composites", filed Sep. 26, 2013.
Lin et al., "Towards Tunable Sensitivity of Electrical Property to Strain for Conductive Polymer Composites Based on Thermoplastic Elastomer," ACS Appl. Mater. Interfaces 2013, 5, 5815-5824.
Li et al, "Computational study on entanglement length and pore size of carbon nanotube buckypaper," Appl. Phys. Lett. (2012), 100, 021907.
Geoffrey A. Slipher, Randy A. Mrozek & Justin L. Shumaker, "Tunable Band-Pass Filters Employing Stretchable Electronic Components," Proceedings of the ASME 2012 Conference on Smart Materials, Adaptive Structures and Intelligent Systems SMASIS2012, Sep. 19-21, 2012, Stone Mountain, Georgia, USA (paper and side presentation).
Mrozek et al., "Highly conductive, melt processable polymer composites based on nickel and low melting eutectic metal," Polymer (2010) 51 2954-2958.
Dae-Hyeong Kim and John A. Rogers, "Stretchable Electronics: Materials Strategies and Devices," Adv. Mater. 2008, 20, 4887-4892.
Tsuyoshi Sekitani et al., "A Rubberlike Stretchable Active Matrix Using Elastic Conductors," Science 321, 1468 (2008).
Sabit Adanur and Tianyi Liao, "Fiber Arrangement Characteristics and Their Effects on Nonwoven Tensile Behavior," Textile Res. J., 69(11)816-824 (1999).
Reto Haggenmueller et al., "Single Wall Carbon Nanotube/Polyethylene Nanocomposites: Thermal and Electrical Conductivity," Macromolecules 2007, 40, 2417-2421.
Ingo Alig et al., "Establishment, morphology and properties of carbon nanotube networks in polymer melts," Polymer 53 (2012) 4-28.

* cited by examiner

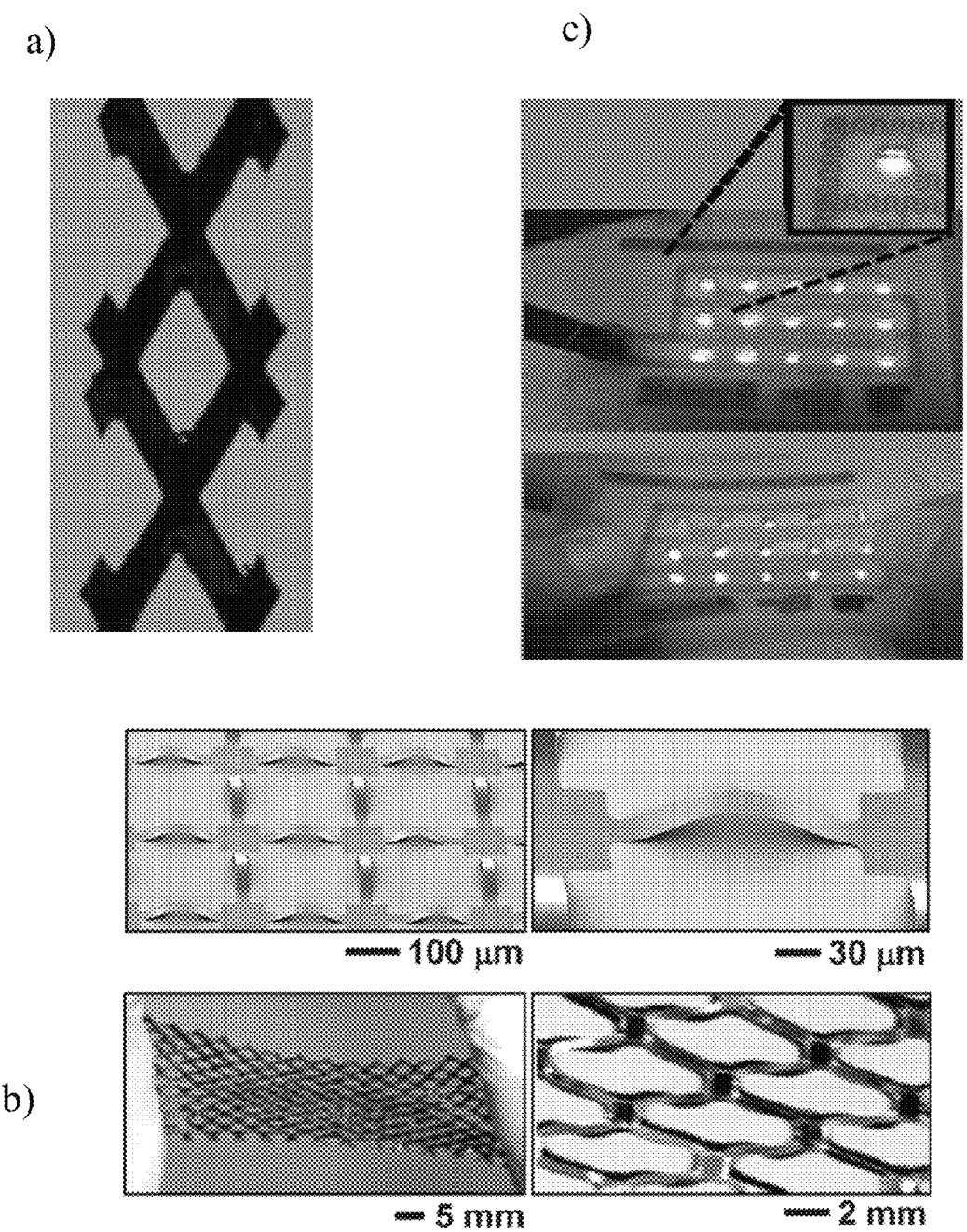
Figure 2. (CONVENTIONAL)

Comparison of different aspect ratios of filler material.

AR = 100

AR = 50

AR = 1 a)

b)

a)

b)

DEFORMABLE POLYMER COMPOSITES WITH CONTROLLED ELECTRICAL PERFORMANCE DURING DEFORMATION THROUGH TAILORED STRAIN-DEPENDENT CONDUCTIVE FILLER CONTACT

CROSS REFERENCE TO RELATED APPLICATION(S)

This application claims the benefit of U.S. Provisional Patent Application No. 61/903,773 filed Nov. 13, 2013, herein incorporated by reference in its entirety for all purposes.

GOVERNMENT INTEREST

Governmental Interest—The invention described herein may be manufactured, used and licensed by or for the U.S. Government.

FIELD

The present invention relates to deformable polymer composites, and more particularly to, deformable polymer composites with controlled electrical performance during deformation through tailored strain-dependent conductive filler contact.

BACKGROUND

Stretchable electronics have the potential to enable a wide variety of emerging applications including sensors/electronic device integration into the textiles, conformable power, enhanced robotic mobility and manipulation, energy harvesting, fieldable biosensing, sensing technology, as well as exoskeletons and multifunctional conforming suits.

Over the past decade, significant effort has focused on the development of organic electronic materials for flexible display applications. However, these materials can only tolerate modest strains such as slight bending and will fail upon larger deformations.

Electrical conductivity in polymeric materials had typically been obtained by three methods:

1) Use inherently conductive polymers. These polymers typically consist of a conjugated backbone to provide electron transport. While the conjugated structure is beneficial for electrical conductivity, it creates an extremely brittle polymer that is prone to fracture at small strains. In addition, the conjugated structure dramatically increases the polymer glass transition temperature $T_g$ making traditional melt processing impossible.

2) Incorporate conductive filler. A significant advantage of conductivity through the incorporation of conductive filler is that it can be readily implemented into a wide range of polymer matrices. The conductivity of the filled polymer composite will depend on the filler type, loading, dispersion, aspect ratio, and the interaction between the filler and the polymer. For example, conventional spherical filler materials can require loadings in excess of 30 vol % to obtain high conductivity.

FIG. 1 is a plot showing reduced viscosity as a function of loading for 200 nm spherical nickel particles in polystyrene (PS) demonstrating the exponential increase in viscosity with filler loading. Here, $\eta^*$ is the complex viscosity of the polymer-nickel composite melt and $\eta^*_{PS}$ is the complex viscosity of the PS melt. At high loadings (e.g., greater than 0.3 vol. fract.), there is an inevitable impact on other properties of the composite including the uniformity of the electrical performance, elasticity, deformability, and processability.

High aspect ratios fillers can be used to produce percolating, conductive pathways at lower loadings than spherical fillers. Carbon nanotubes (CNTs) are the most prevalent large aspect ratio filler in the recent literature and have demonstrated electrical conductivity at low loadings in a variety of rigid, glassy polymer matrices and elastomeric materials.

Despite the favorable results, there are considerable disadvantages associated with practical implementation of CNTs including property uniformity (most promising single-walled CNTs are 66% undesirable semi-conducting CNTs), effective and scalable processing methods (most effective mixing through solution methods or even more complicated processes), and cost (speculated cost reduction of high purity CNTs has yet to be realized). In addition, long carbon nanotubes (typically utilized to produce electrical conductivity) are highly entangled which does not allow adjacent particles to move freely. As a result, conductive materials based on carbon nanotubes are flexible (tolerating modest bending and slight tension typically less than 5% strain) but are not stretchable (large deformations that can reach several hundred percent strain. Recent work has demonstrated that the entanglements between carbon nanotubes can be reduced using a secondary additive however; the composite exhibits increasing resistance with strain consistent with most conductive composites containing spherical particles. See, e.g., Lin et al., "Towards Tunable Sensitivity of Electrical Property to Strain for Conductive Polymer Composites Based on Thermoplastic Elastomer," ACS Appl. Mater. Interfaces 2013, 5, 5815-5824. To make highly entangled carbon nanotube composites stretchable typically requires geometric patterning discussed in the section below.

3) Deposition of conductive materials on a flexible surface. Electronic devices that are formed from organic or inorganic conductive materials on thin plastic sheet or metal foils will be flexible but cannot typically undergo large deformations like stretching without damage.

FIG. 2 shows conventional examples of geometric patterning to obtain "stretchable" conductivity where FIG. 2(a) is a conductive carbon nanotubes mat that is perforated with a "diamond" pattern to enable deformation, FIG. 2(b) buckled ribbons, and FIG. 2(c) conductive "meanders" of metallic film. This past work incorporates geometric features that can tolerate slight stretching within a determined range. The production methods of these materials are rather intricate but could potentially be scaled up within the limits of current lithographic techniques. However, the incorporation of geometric features into circuits requires an additional finite element design step to avoid premature failure of the circuitry regardless of material.

Collectively, the existing conductive polymeric material, and recent advances in geometrically patterned devices will not meet future Army needs for stretchable electronics.

BRIEF SUMMARY OF THE INVENTION

Aspects of the present invention generally relate to deformable polymer composites, and more particularly to, deformable polymer composites with controlled electrical performance during deformation through tailored strain-dependent conductive filler contact.

According to embodiments, a deformable elastomeric conductive material includes: an elastomeric polymer matrix; and conductive filler material uniformly dispersed in the elastomeric polymer matrix sufficient to render the material electrically or thermally conductive. The conductive filler material comprises a plurality of substantially non-entangled particles having an aspect ratio sufficiently large to enable the particles to substantially remain in contact and/or in close proximity with adjacent particles so as to maintain conductive pathways in the material when the material is subjected to deformation up to and exceeding 10% strain.

The amount of particles in the elastomeric polymer matrix can range from 0.01 to 50 vol %, and the aspect ratio of the particles can range from about 1.5 to 100,000. Generally, the particles can be individually dispersed, dispersed in aggregate in bundles, or a combination thereof, in the elastomeric polymer matrix. For instance, the amount of particles in the bundles may range from 1 s to 100 s. The particles remain in contact and/or in close proximity with adjacent particles when subjected to deformation in a range of 1% to 100% strain. The particles may be substantially straight and rigid, in some instances. Depending on the application, the material may maintain a conductivity of at least 0.01 S/cm when subjected to said deformation.

In some instances, the elastomeric polymer matrix may include: poly(styrene-b-isoprene-b-styrene), poly(styrene-b-ethylene-co-butylene-b-styrene), poly(styrene-b-butadiene-b-styrene), polybutadiene, natural rubber, silicone elastomer, epoxy elastomer, poly(propylene oxide) rubber, chloroprene, butyl elastomers, acrylonitrile butadiene styrene, butyl elastomer, or nitrile elastomer. And the conductive filler material may include: nickel-coated carbon fibers, nickel nanorods, nickel flakes, nickel-coated graphite, copper nanorods, copper flakes, nickel nanostrands, nickel-coated carbon nanotubes, silver nanorods, silver flakes, copper fiber, silver fiber, nickel fiber, stainless steel fiber, gold nanorods, gold flakes, gold fibers, graphene flakes, graphite flakes, carbon nanofiber, or non-entangled carbon nanotubes.

The material may further include solid additives uniformly dispersed in the polymer; the solid additives may be $C_{60}$ "buckyballs" or conductive nickel spheres. The solid additives may range from 1.5 nm to 500 µm in length or diameter. In some instances, the amount of the solid additives ranges from about 0.5 volume percent to 50 volume percent.

Also the material may further include liquid additives. The liquid additive generally comprises a room temperature liquid eutectic metal alloy or an ionic liquid. Liquid eutectic metal alloys may comprise Gallium/Indium or Gallium/Indium/Tin, and ionic liquids may comprise 1-ethyl-3-methylimidazolium chloride, 1-ethyl-3-methylimidazolium tetrafluoroborate, 1-butyl-3-methylimidazolium hexafluorophosphate, 1-butyl-3-methylimidazolium chloride, 1-alkylpyridinium chloride, or N-methyl-N-alkylpyrrolidinium hexafluorophosphate). In some instances, the amounts of liquid additives range from about 5 volume percent to about 80 volume percent.

The material may be formed according to one of: Example 1, Example 2, Example 3, Example 4, and Example 5, described herein.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. These embodiments are intended to be included within the following description and protected by the accompanying claims.

FIG. 2 shows conventional examples of geometric patterning to obtain "stretchable" conductivity.

DESCRIPTION OF THE INVENTION

An innovative technology for deformable elastomeric conductor materials that readily deform and are capable of functioning even when subjected to high strain is disclosed herein. This technology does not use a conventional metal conductor, but instead uses elastomeric materials having conductive additive materials—which not only readily permits elastic deformation, but also maintains conductive properties of the materials when deformed.

Figure 1:
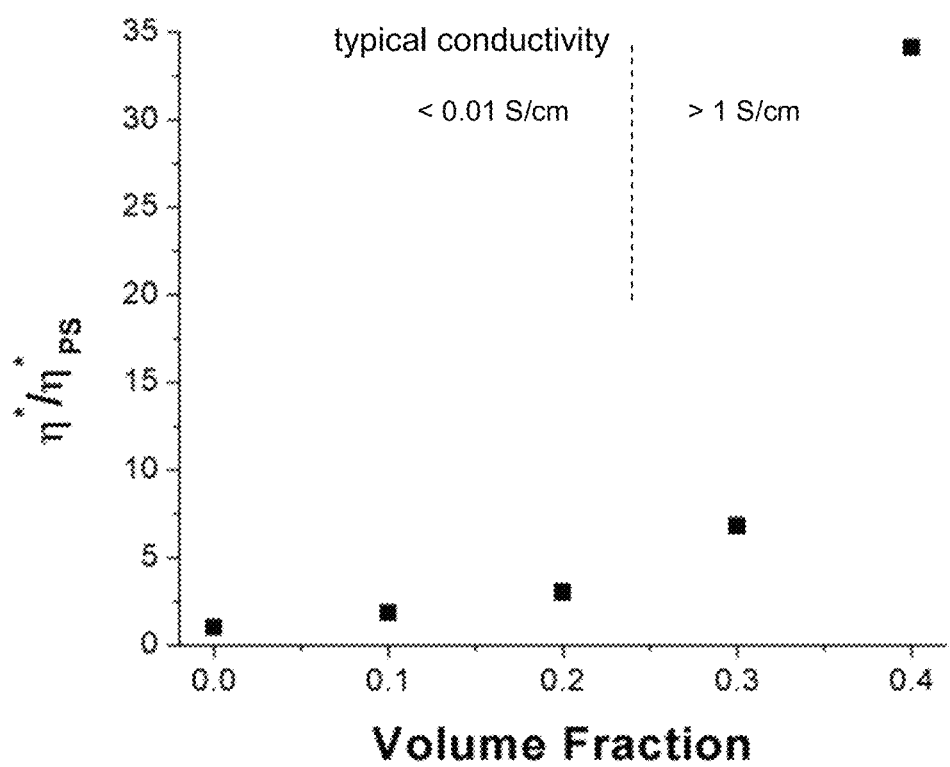
FIG. 1 is a plot showing reduced viscosity as a function of loading for 200 nm spherical nickel particles in polystyrene demonstrating the exponential increase in viscosity with filler loading.
Figure 3:
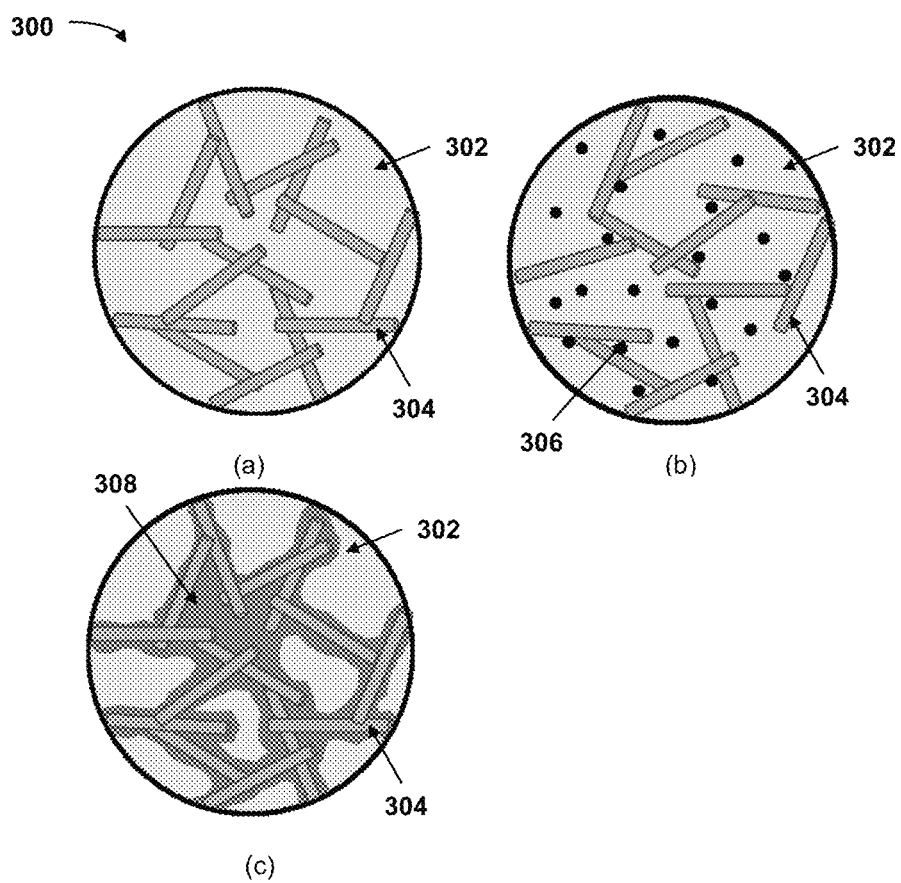
FIG. 3 shows exemplary schematics of deformable elastomeric conductive materials according to embodiments of the present invention.

FIG. 3 shows exemplary schematics of sample portions of deformable elastomeric conductive composite material 300 according to embodiments. The sample portion is illustrated within the circle portion in the figure; however, it should be appreciated that the material 300 may be formed in various shapes, sizes and other forms as desired. The material 300 is configured to be deformed and sufficiently maintain conductive performance during tension (stretching), compression (squeezing), and/or mixed mode deformations, like twisting, while maintaining or controlling performance.

In general, as illustrated in FIG. 3(a), the deformable elastomeric conductive composite material 300 is formed of an elastomeric polymer matrix material 302 having conductive filler material 304 that is substantially uniformly dispersed therein. Due to the elastomeric polymer matrix material 302, the elastomeric conductive material 300 is relatively compliant and elastic in nature. Elastic as used herein refers to elastic deformation, which is typically defined as reversible deformation, rather than permanent (plastic) deformation. It is typical characterized as having linear response (or slope) with regards to stress/strain. Straining a polymer containing conductive fillers can result in decreasing conductivity due to an increased spacing between particles, such as discussed in the Lin et al. article, mentioned above. To provide constant or increasing conductivity, the increased particle spacing when strained must be mitigated. To this end, to maintain constant conductivity regardless of strain, the material 300 utilizes conductive filler materials 304 in the polymer 302 that can "slide" along each other but remain in contact and/or in close proximity to provide conductive pathways at small and large deformations (such as greater than 10% strain) and/or in complex deformation modes like twisting or biaxial stretching. The filler particles 304 may be substantially straight (elongated) and rigid, in some embodiments, to prevent entanglements therebetween as further discussed below.

As known in the art, the term "strain" is defined as the amount of deformation due to stretching an object experiences compared to its original size and/or shape. Strain is typically given as dimensionless or normalized values. Uniaxial strain is strain which is substantially related to, or affecting, substantially only one axis. Biaxial strain is strain in two perpendicular axes. While electrical conduction is a primary focus to enable deformable or stretchable electronic device production, it should be appreciated that the same materials could be used to provide thermal conductive capabilities also.

The conductive filler material 304 comprises a plurality of substantially non-entangled particles which have an aspect ratio sufficiently large to enable the particles to substantially remain in contact and/or in close proximity with adjacent particles so as to maintain conductive pathways in the material 300 when the material is subjected to deformation up to, and exceeding 10% strain. The innovative materials described herein may be designed to controlled electrical performance from 1 to 100% strain. Above 10% strain, and more particularly, 20% to 100% strain, may be of considerable importance for many applications. Although, it is believed that embodiments can be prepared which enable elongation in excess of 500% which will enable additional applications.

Under deformation, the filler particles will orient relative to the deformation and the large number of inter-particle connections produced by the particles having an aspect ratio greater than 1 will result in maintained conductive pathways. More particularly, the aspect ratio (AR) of the filler materials 304 plays an important role to this end. In general, the aspect ratio is defined as the ratio of width (or length) to height of an element. Many filler materials can be approximated as a small cylindrical-like element, for example.

Figures 4A, 4B:
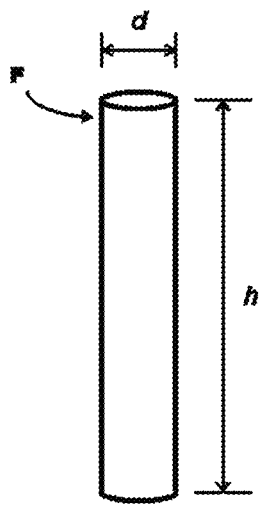
FIG. 4A is a conceptual schematic for a cylinder-like filler element.
FIG. 4B is a schematic showing a comparison of different aspect ratios of filler material.

FIG. 4A is a conceptual schematic for an exemplary cylindrical filler element F having a diameter d and height h. The AR of a cylindrical-like filler element may be defined as the ratio of its height h to its diameter d. (An AR of 5, for instance, would mean that the height of the cylindrical-like filler element is 5 times its diameter). FIG. 4B is a schematic showing a comparison of different aspect ratios of filler exemplary material having ARs of 1, 50 and 100, respectively. This figure shows the relative differences in filler geometry associated with a transition from low to high aspect ratio.

The characteristic dimension of the filler conductive particles can vary between a few nanometers to a few microns, for instance. Some conductive particles having aspect ratios on the order of 1 (e.g. spheres) may not be readily capable of providing performance when significantly stretched. Rather, high aspect ratio particles, having an AR ranging from as little as 1.5 to 3 and upwards to about 100,000 may be used. Strains of about 10% may only require an AR of 1.5 depending on concentration, for instance. Higher strain deformation may require higher AR filler particles. Although, there is no theoretical limit to the aspect ratio of the fillers.

The addition of high aspect ratio (AR) particles, i.e., particles with AR greater than 1.5, to a host polymer can result in decreased elasticity. While this negative impact is expected due to the particle geometry, the magnitude of the impact is often enhanced through strong particle-particle interactions coupled with physical entanglement of the particles hindering particle movement upon deformation. Therefore, if the particle entanglements are sufficiently eliminated, or the particle-particle frictional forces reduced, then the particles will "slide" across each other, while maintaining electrical percolation during large deformations.

Various elastomeric materials for the polymer 302 can be used, provided that they lend themselves to incorporating the conductive filler material with homogenous distribution therein. For instance, the stretchable polymer matrix material may be formed of various polymeric, rubber, resin, plastic materials, or the like. They may include thermosetting polymers and thermoplastic. Of course, the choice of a particular polymer matrix material 302 may be driven by the particular application environment that is anticipated.

For example, viable stretchable polymeric matrix materials 302 may include, but are not necessary limited to: poly(styrene-b-isoprene-b-styrene), poly(styrene-b-ethylene-co-butylene-b-styrene), poly(styrene-b-butadiene-b-styrene), polybutadiene, natural rubber, silicone elastomer, epoxy elastomer, poly(propylene oxide) rubber, chloroprene, butyl elastomers, acrylonitrile butadiene styrene, butyl elastomer, or nitrile elastomer. A mixture of two or more polymer materials 302 may also be used in the composite material 300.

There are many conductive filler materials 304 which can provide adequate conductivity to transmit electricity and/or thermal energy in the composite material 300. Generally, many conductive filler materials 304 may be utilized that are capable of exhibiting sufficient electron mobility in the presence of an electric field. Some examples of conductive fillers may include, but are not necessary limited to: nickel-coated carbon fibers, nickel nanorods, nickel flakes, nickel-coated graphite, copper nanorods, copper flakes, nickel nanostrands, nickel-coated carbon nanotubes, silver nanorods, silver flakes, copper fiber, silver fiber, nickel fiber, stainless steel fiber, gold nanorods, gold flakes, gold fibers, graphene flakes, graphite flakes, carbon nanofiber, or non-entangled carbon nanotubes. Mixtures of one or multiple filler materials (including those of different ARs) may also be used in some implementations.

Carbon nanotubes (CNT) may present a challenge. For instance, when CNTs reach a certain length (generally dependent on their diameter), they will become entangled (see FIG. 10(a)). This length will depend on the bending stiffness and binding energy of the CNT. (See, e.g., Li et al, "Computational study on entanglement length and pore size of carbon nanotube buckypaper," Appl. Phys. Lett. (2012), 100, 021907). But there are many different types of CNTs, and thus their specific lengths resulting in entanglements may vary. In any event, it is believed that short carbon nanotubes, which generally will remain in a substantially non-entangled arrangement, will work for this invention (this is counter to the research direction of the community where longer carbon nanotubes are recognized as enabling conductivities at lower concentrations). In both cases they remain flexible and would not be considered rigid.

The conductive filler materials 304 are illustrated as having a cylindrical shape. However, this is for ease of illustration, and this is not limiting; it should be appreciated that they may have various other cross-sectional forms, such as linear, platelet-like, rectilinear, square, etc.

The material 300 utilizes controlled contact and/or close proximity between adjacent filler material 304 in the polymer 302 to provide a tailored conductive (e.g., electrical, thermal) response when subjected to deformation. It is ideal if particles are truly in physical contact with adjacent particles; however, electrical conductivity can occur by a "hopping" mechanism. As a result, the non-entangled particles only need to be close enough to enable hopping of electrons. Thermal conductivity, on the other hand typically, generally requires at least some direct contact of adjacent particles.

This material 300 can fabricated to exhibit increasing, decreasing, and maintained conductivity with increasing strain to facilitate a new class of highly deformable, stretchable electronic devices. These devices can be implemented into platforms previously inaccessible to traditional rigid electronics to provide enhanced capabilities on the battlefield and in the civilian sector.

The conductive filler materials 304 minimizes the well-understood negative impacts of conventional conductive particle addition by eliminating particle entanglements and reducing particle friction forces to allow filler particles 304 to slide along each other, maintaining electrically conductive pathways in the material.

Filler particles 304 are typically received as larger aggregates from the vendor mostly due to the large surface energy of the particles. The aggregation becomes even more pronounced at smaller sizes due to the higher surface area-to-volume ratio. Typically, these aggregated groups of particles need to be disrupted and the particles dispersed individually to provide uniform performance in the composite. For example, aggregation may be used to an advantage by using the strain to "break up" the individual particles in the aggregate but the particles will remain in close proximity due to the polymer matrix they are embedded in. The particle size will generally remain constant whether dispersed or in a bundle. In some embodiments, multiple particle sizes or aspect ratios may be used. The amount of particles in each bundle, may depend on the particle chemistry, particle size, and the mixing state ranging from very few (e.g., 3-5) to several 100s (e.g., 100-500). Most commonly Van Der Waals forces keep the filler particles together in the bundles. However, some aggregates may be held together by hydrogen bonding or electrostatic interactions. Aggregates are often arranged in a manner that maximizes surface interaction (e.g., parallel in the case of cylinders or sheets). However, they can also be disordered as the result of entropy or an artifact of the production process.

In various embodiments, the material 300 may further be formed with additional conductive additives that eliminate entanglements and/or reduce friction between adjacent particles to promote "sliding" across each other and maintain electrical pathways during deformation. For instance, as illustrated in FIG. 3(b), solid additives 306 may optionally included in the polymer 302 in some embodiments to further enhance the sliding action of the fillers 304. Examples of these may include spherical particles include $C_{60}$ "bucky-balls" and conductive nickel spheres. Of course, other small particles may also be used.

The size of the conductive spherical particles depends on the application. However, it is envisioned that the range of sizes could be from around 1.5 nm (e.g., for bucky-balls) to 500 μm (e.g., for other, larger particles). It is envisioned that for many applications, the particle size should be about $\frac{1}{10}^{th}$ the thickness of the sample. However, there is no theoretical limit to the particle size if the material dimensions in the application are large enough and the particle size can be as large as ½ the thickness (it is noted that this may require a higher concentration of particles in some instance). The amounts could vary from 0.5 volume percent to 50 volume percent, for instance.

Additionally, as illustrated in FIG. 3(c), other conductive liquid additives 308 may optionally be included in the polymer 302 in some embodiments to help maintain conductive pathways therein. While the liquid additives 308 are illustrated as globules in the figures, it should be appreciated that the liquids will be dispersed (partial or fully) in the polymer matrix 302. Moreover, they advantageously "wet" or "coat" the filler materials 304 (as better illustrated in FIG. 6a).

For example, a room temperature liquid eutectic metal alloy (e.g. Gallium/Indium or Gallium/Indium/Tin (i.e. Galinstan®)) and/or ionic liquid (e.g., 1-ethyl-3-methylimidazolium chloride, 1-ethyl-3-methylimidazolium tetrafluoroborate, 1-butyl-3-methylimidazolium hexafluorophosphate, 1-butyl-3-methylimidazolium chloride, 1-alkylpyridinium chloride, and N-methyl-N-alkylpyrrolidinium hexafluorophosphate) could be incorporated along with the particulate to form highly conductive liquid metallic bridges or ionic liquid bridges, respectively, between adjacent particles. The amounts of conductive liquids could range anywhere from about 5 volume percent to act as conductive bridges between adjacent solid particles to about 80 volume percent where it is acting as a continuous conductivity medium. The conductive liquid 308 will deform during strain but will further help to maintain the conductive pathways between the particles. An advantage of this approach is that the liquid additive will offset the impact of the solid particulate on the mechanical properties and processability of the polymer while maintaining the electrical conductivity.

In other embodiments, both the solid additives 306 and the conductive liquid additives 308 may be included in the polymer matrix 302.

Figure 5:
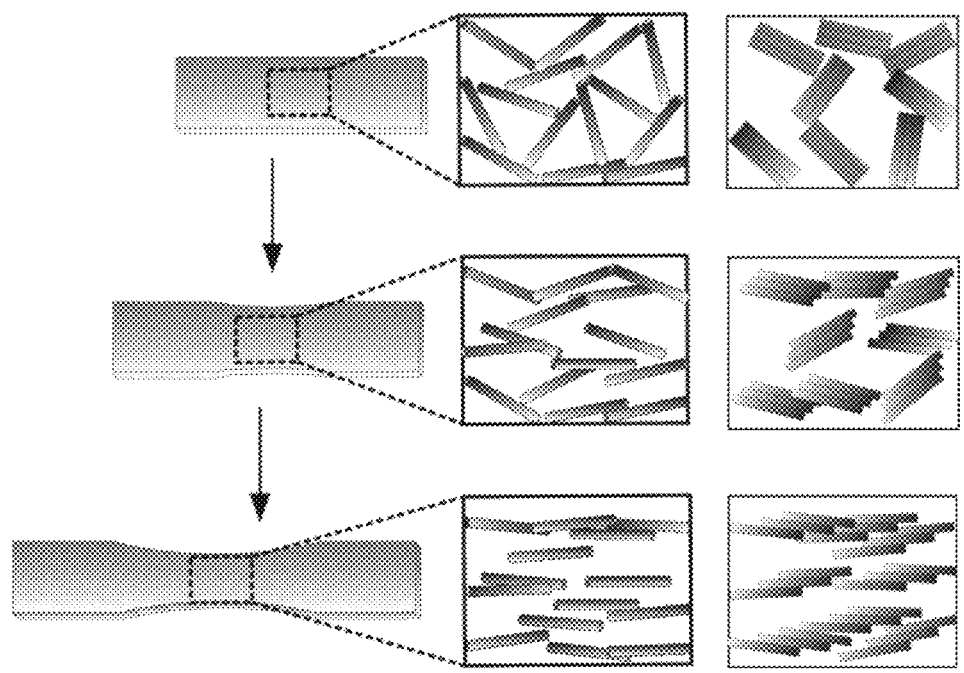
FIG. 5 shows a schematic of polymers filled with "controlled slip" high aspect ratio particles that will remain above the percolation threshold at large elongations.

FIG. 5 shows that sliding fillers can work with well dispersed individual particles or with dispersed aggregates of multiple filler particles in a polymer showing increasing deformation of the material.

In the former case, the individual particles rotate and slide across each other as the material elongates. In the latter case, the aggregates will rotate and slide across each while also potentially increasing dispersion to maintain conductive pathways.

Figure 6:
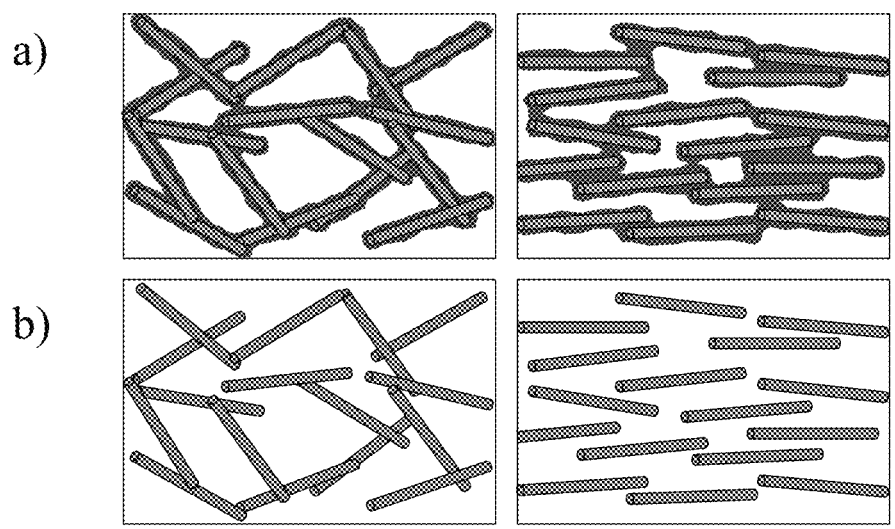
FIG. 6 shows schematics of a conductive fiber loaded composite at percolation a) with and b) without added eutectic metal before and after deformation.

FIG. 6 shows schematics of a conductive fiber loaded composite at percolation a) with and b) without added eutectic metal before and after deformation. The eutectic metal will generally help maintain conductivity during deformation rather than providing increased conductivity due to deformation.

Providing increased conductivity when the material is strained is a very difficult challenge that, to our knowledge, no one is currently trying to address. To increase conductivity, the inter-particle distance must be reduced or inter-particle contact must be increased upon deformation. This can be accomplished by utilizing weak polymer-filler interactions or tunable surfactants that, as-produced, will form a coating on the particles decreasing the contact between adjacent particles and the resulting conductivity.

Weak polymer-filler interactions refer to strength of the attractive interaction between the polymer and the particle surface. In these systems, an attractive (as opposed to repulsive) interaction is wanted that only slightly favors the polymer adsorbing onto the polymer surface (i.e. weakly attractive). As a result of this weak attractive interaction, the polymer will form a coating on the particle, but that coating can be removed with minimal force. (A real-world analog would be food on a Teflon pan typically requires a little bit of force to come off but far less than a non-Teflon coated pan.) At a minimum, this interaction would require the cohesive strength to be higher than the adhesive strength (i.e. the failure occurs at the interface rather than the bulk polymer). It is believed this occurs in the poly(styrene-b-isoprene-b-styrene) composites containing nickel-coated carbon fiber (NCCF).

Although, it is noted that the strength of the polymer—particle surface interaction has not yet been measured. In a non-conductive system, the interaction between the polymer and particle surface could be optimized through chemical modification of the particle surface. However, chemical modification of a conductive surface typically reduces its conductivity. As an alternative, the polymer-particle interaction might be altered using non-covalent bonding through a surfactant. When the material is strained, the surfactant will have a higher interaction with the polymer than the particle surface and will de-adhere from the surface.

Figure 7:
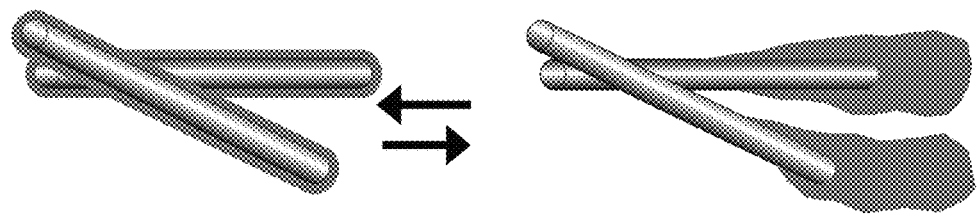
FIG. 7 shows schematic of a polymer coating that will delaminate upon deformation to increase conductivity and relax upon recovery from deformation to regain its lower conductivity state.

FIG. 7 is a schematic of a polymer coating that will delaminate upon deformation to increase conductivity and relax upon recovery from deformation to regain its lower conductivity state. Upon deformation, the weak polymer-particle interactions will result in the polymer delaminating from the conductive particle and peeling away from the particle surface allowing for increased contact between adjacent particles and increased conductivity When the strain is removed, the polymer will relax and the coating will be recovered resulting in a reduced conductivity to the pre-strained value.

Figure 8:
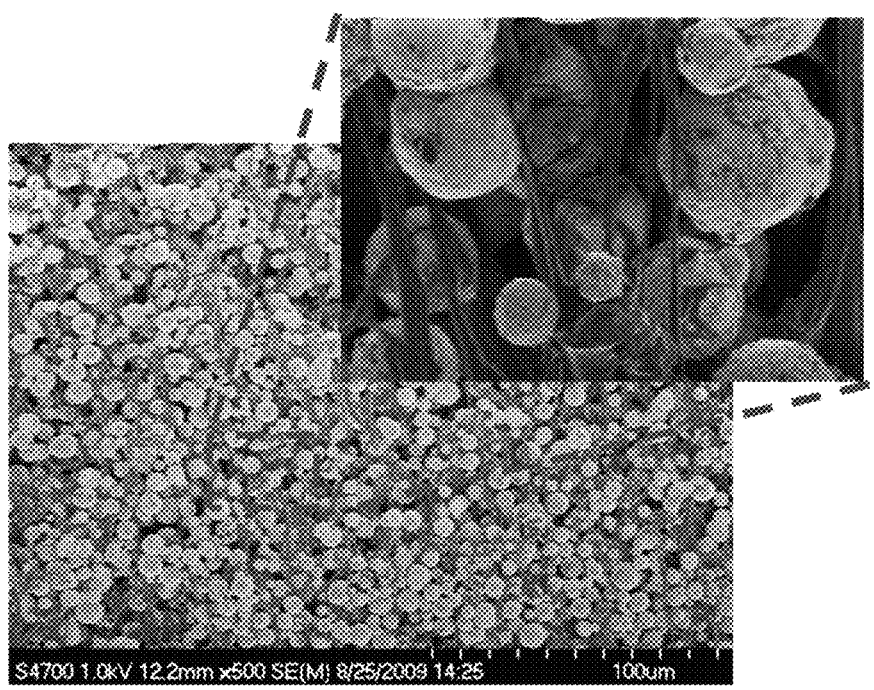
FIG. 8 shows a scanning electron microscope (SEM) image of a highly filled particle composite that exhibits an interconnected void structure and a large amount of exposed particle surface area.

Alternatively, the microstructure of the conductive composite can be tailored to produce continuous porosity with a large amount of exposed particle surface area. FIG. 8 is a SEM image of a highly filled particle composite that exhibits an interconnected void structure and a large amount of exposed particle surface area. This type of structure can be obtained using the novel processing approaches described in U.S. Provisional Patent Application No. 61/883,171 filed on Sep. 26, 2013, herein incorporated by reference in its entirety.

As produced, the particle spacing will be large enough to limit conductivity. The optimum particle spacing will depend on the strain-dependent electrical response required. For example, if the desired response is increasing conductivity starting at 5% strain the spacing will be closer than if the conductivity increase were to start at 25% strain. In addition, the application voltage will change the spacing as a higher voltage may require a larger spacing to prevent conductivity. Upon deformation, the porous elastomeric structure will collapse resulting in increased particle contact and enhanced conductivity. This same structure could be backfilled with a liquid conductor to produce redundant conductive pathways that exhibit uniform conductivity when strained. One exemplary liquid conductor that may be used is Galinstan (gallium-indium-tin eutectic). The amount is dependent on the pore volume and could be as high as 90 volume percent.

A unique aspect and very important advantage of the innovative deformable elastomeric conductive materials is that it they lend themselves to tailoring the strain-dependent electrical behavior (inherent to the material; but do not require specialized geometries or patterning to tolerate strain). It has been found that targeted particle contact behavior is dependent on the desired electrical response when the strain is increased. To this end, the material 300 properties can be judiciously tailored for a particular application:

Decreasing conductivity: decreased particle contact or increased particle spacing to reduce conductive pathways.

Constant conductivity: uniform particle contact to maintain conductive pathways.

Increasing conductivity: increased particle contact or reduced particle spacing to enhance the conductive pathways.

This is a significant departure from conventional technologies which required geometric patterning. For example, the deformable elastomeric conductive materials 300 advantageously maintain electrical conductivity, even at large deformation (e.g., greater than 10% and more preferably greater than 20% strain), and can exhibit a controlled increase or decrease in conductivity with increasing strain.

The highly deformable material can be used to replace traditional electronic components to enhance their utility in the field. In addition, the innovative materials can be used to form highly deformable devices which can be implemented into platforms that were previously inaccessible to traditional rigid electronics platforms including soft robotics, textiles (including high strain locations like knee and elbow bending), and monitoring electroencephalography (EEG) signals, electrocardiogram (EKG) signals, and vital signs on the battlefield in a ballistically safe manner.

Accordingly, this material system may enable the production of monolithic elastomeric sheets that exhibit controlled and tailored strain-dependent electrical conductivity and can be cut, printed, molded, or cast into the desired device design. This innovative technology does not require patterning to generate strain tolerant, conductive materials. Of course, if a specific application can accommodate patterning of the conductive material, this technology can be used in concert with geometric patterning to further enhance the stretchable electronic material performance. In addition, the same design principles to produce an elastomeric sheet can be used to produce a printable or sprayable ink to enhance the range of platforms accessible for implementation through additive manufacturing. The innovative technology can also be coupled with controlled localization and orientation of the filler using external electric and magnetic fields to tailor the electrical performance. This effect can be utilized to control the orientation of the particles to provide optimum performance in complex strain states like twisting or bending. In addition, conductivity can be obtained at lower overall particle loadings by producing locally concentrated conductive pathways in an elastomeric polymer matrix. Complex particulate organization and orientation can be obtained using a combination of non-uniform fields, to induce migration and localization, and uniform fields to refine orientation.

The utility of "sliding" filler contacts extends to processing of polymer composites containing high particle loadings that are relevant for melt processable electronic materials. To obtain relevant conductivity (e.g., greater than 0.01 S/cm) requires sufficient particle loading to produce very small particle spacing or, more ideally, direct particle contact. A specific density may not be that critical in all embodiments. Although, it should be noted that decreasing the weight can be accomplished by changing the filler type i.e. nickel-coated carbon fiber vs. nickel fiber. The amount of fillers in the polymer can generally range from about 0.01 to 50% vol.

At these high particle loadings, the close contact of the particles produces a dramatic increase in the melt viscosity of the polymer composite during melt processing. The increased viscosity can reduce or even eliminate the ability to process the material. However, the impact on the viscosity can be reduced by promoting sliding between adjacent fillers. As a result, the invention has broad applicability for melt processing of highly particle filled composites including elastomeric (i.e. stretchable rubbers) and rigid polymers.

Example 1: Nickel-Coated Carbon Fibers in a Poly(styrene-b-isoprene-b-styrene) Thermoplastic Elastomer Matrix Materials NCCF was used as-received from Sulzer Metco (Fort Saskatchewan, Alberta, Canada). Poly(styrene-b-isoprene-b-styrene) (SIS) 4111 was used as-received from Dexco Polymers (Houston, Tex., USA).

Composite Production

Nickel-coated carbon fiber (NCCF) was mixed with the poly(styrene-b-isoprene-b-styrene) (SIS) 4111 at 25 vol % of NCCF using a DSM conical twin screw extruder (Geleen, Netherlands) at 200° C. and 50 rpm for 15 min. The extrudate was then melt pressed at 160° C. and 20,000 lbf for 3 min to form a ribbon (about 1 cm wide×20 cm long×0.1 cm thick).

The initial dimensional of the NCCF particles are 10 µm in diameter and 500 µm long on average. The product is listed by the vendor as 67% Nickel by weight. No particle thickness is quoted in the product literature; but SEM images of the particles indicates that the nickel coating on the fibers appears to be approximately 1 µm thick. It is further noted that the same sized NCCF particles were used in each of Examples 1-5.

Conductivity as a Function of Uniaxial Elongation

The conductivity was measured using a four wire technique recording the resistance and distance between inner electrodes. The volume conductivity was determined from the reciprocal of the resistance normalized by the distance between the electrodes.

Figure 9:
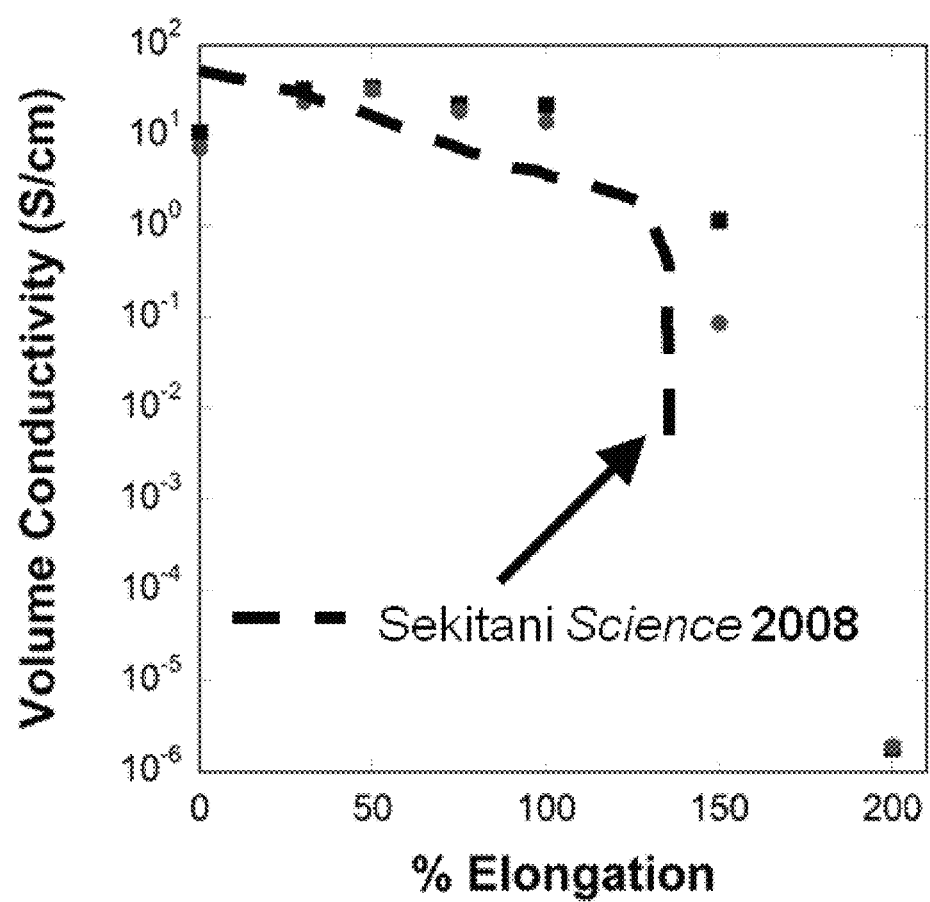
FIG. 9 is a plot showing conductivity versus elongation of poly(styrene-b-isoprene-b-styrene) (SIS 4111) containing 25 vol % nickel-coated carbon fiber (NCCF) (data points) compared to a commonly cited materials benchmark (dashed line) composed of a perforated mat of carbon nanotubes.

FIG. 9 is a plot showing conductivity versus elongation of SIS 4111 containing 25 vol % NCCF (data points) compared to a commonly cited materials benchmark (dashed line). The material maintained conductivity over 10 S/cm up to 100% elongation followed by reduced conductivity at 150% elongation, and a loss of conductivity at 200% elongation. To put this result in context with the state-of-the-art, this electrical performance matches a commonly-cited performance benchmark, that utilizes specialty "super growth" carbon nanotubes mats and limited scalability processing methods (see dashed line plot) as disclosed in Tsuyoshi Sekitani et al., "A Rubberlike Stretchable Active Matrix Using Elastic Conductors," *Science* 321, 1468 (2008).

More importantly, this benchmark exploits perforations in the carbon nanotube mat (see, e.g., FIG. 2(*a*)) to obtain the "stretchability" because carbon nanotubes, while inherently flexible, are not stretchable. In addition, long carbon nanotubes can become highly entangled which will hinder sliding. In contrast, the innovative materials described herein can utilize traditional polymer melt processing techniques that are common for industrial scale-up and commodity materials. The stretchable conductive performance is attributed to the high conductivity and non-entangled nature of the NCCF filler, which facilitates "sliding" between adjacent NCCF particles during deformation.

Figure 10:
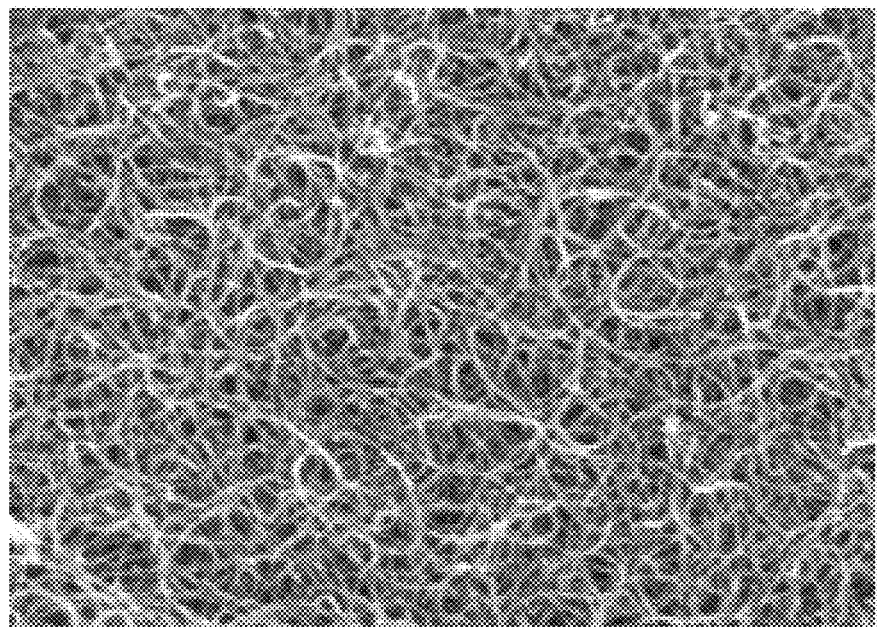
FIG. 10 shows images of a) carbon nanotubes obtained by transmission electron microscopy (TEM) and b) nickel-coated carbon fiber obtained by reflected light microscopy demonstrating the difference in entanglement between the two fillers.
Figure 10:
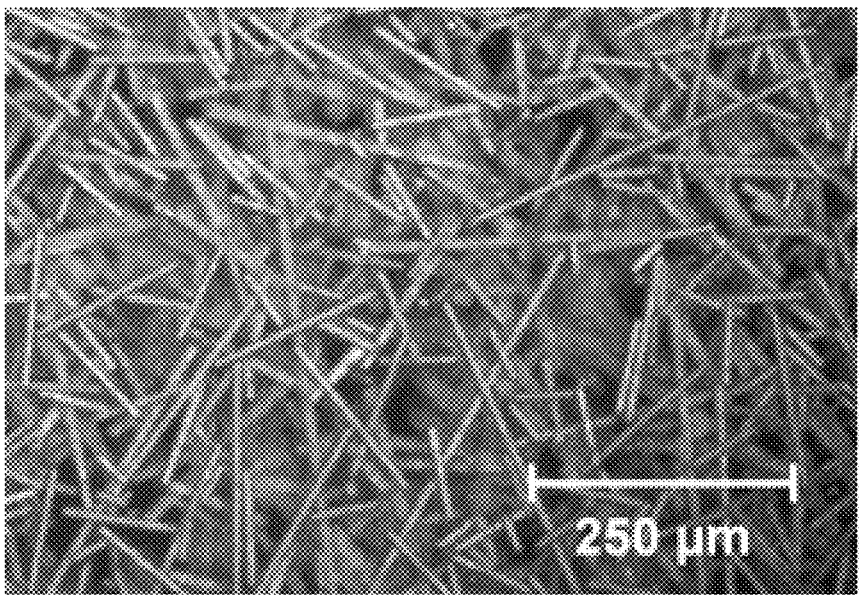

FIG. 10 shows representative TEM images of carbon nanotubes and nickel coated carbon fibers obtained by optical light microscopy, respectively, demonstrating the difference in entanglement between the two fillers. The carbon nanotubes here are approximately 10 nm in diameter and approximately 1 µm long (FIG. 10*a*). The nickel-coated carbon fibers are approximately 10 µm in diameter and approximately 500 µm long (FIG. 10*b*).

Comparison of Conductivity and Simulated Device Performance with State-of-the-Art "Stretchable" Conductors The performance of the innovative conductive elastomer (noted as "ARL-developed" in the figures) in stretchable resistor and capacitor elements, respectively, was compared to carbon grease, which is the current state-of-the-art (SOA) for non-patterned stretchable conductors. The SOA carbon grease product is called Carbon Conductive Grease manufactured by MG Chemical (manufacturer number 846-80G).

Figure 11A:
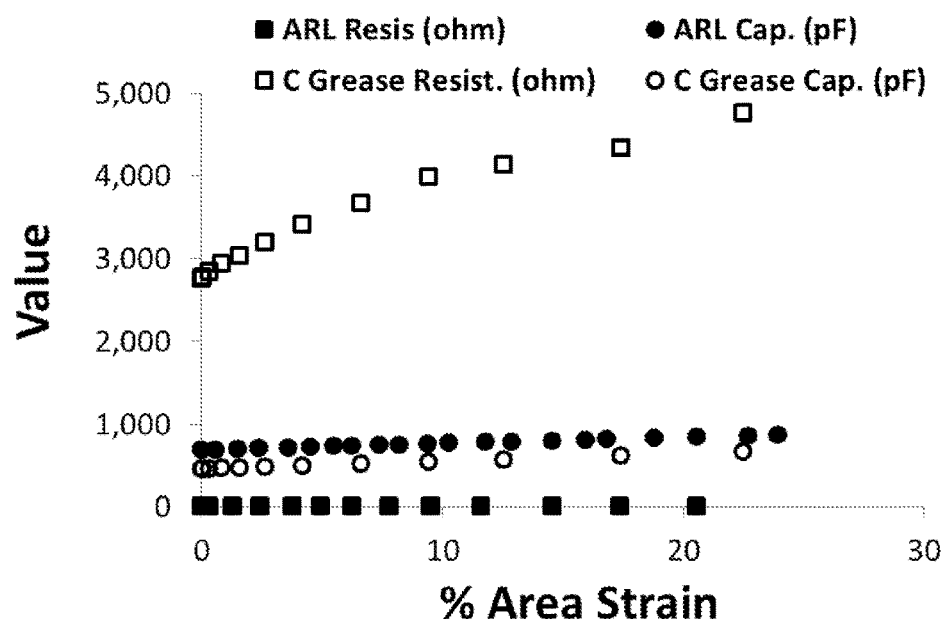
FIGS. 11A and 11B show a plot showing electrical resistance of an electrode as a function of aerial strain when simulated as a resistor and capacitor element, respectively, compared to carbon grease, the current state-of-the-art (SOA) "stretchable" material, in the same configuration. This data shows the electrode exhibits similar capacitance and reduced resistance compared to the SOA carbon grease.
Figure 11B:
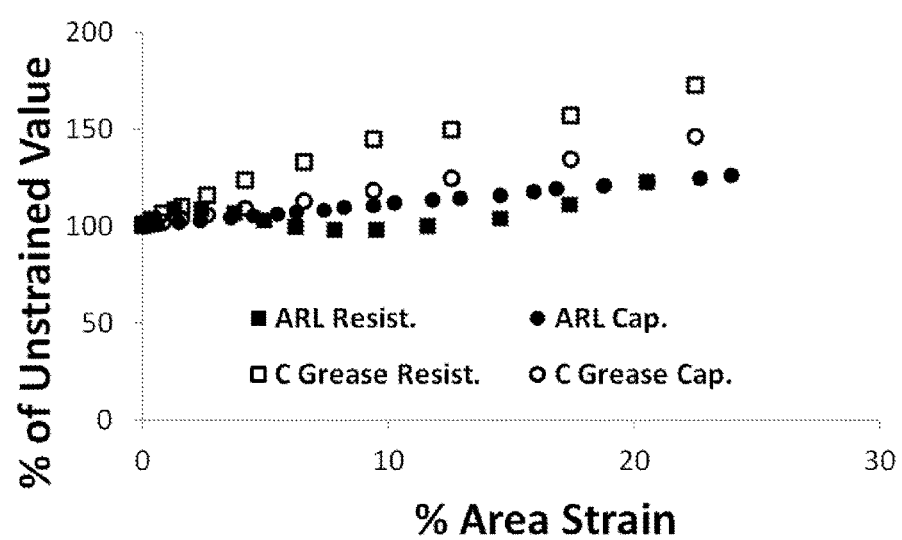

FIGS. 11A and 11B show electrical resistance of an electrode as a function of aerial strain when used as a resistor and capacitor element, respectively, compared to carbon grease, the current SOA "stretchable" material, in the same configuration. This data demonstrates a reduced change in electrical character with increasing strain to provide a uniform performance regardless of strain state. More importantly, similar or enhanced performance is observed for the "ARL-developed" material and it is an easier to implement elastomeric solid relative to the more fluid-like SOA carbon grease.

Comparisons of the two materials demonstrated that innovative conductive elastomer (noted as "ARL-developed" in the figures) exhibited similar capacitance and significantly higher conductivity than the current SOA. More importantly, the innovative conductive material provided a more uniform performance as a function of strain when compared to the current SOA.

Figure 12:
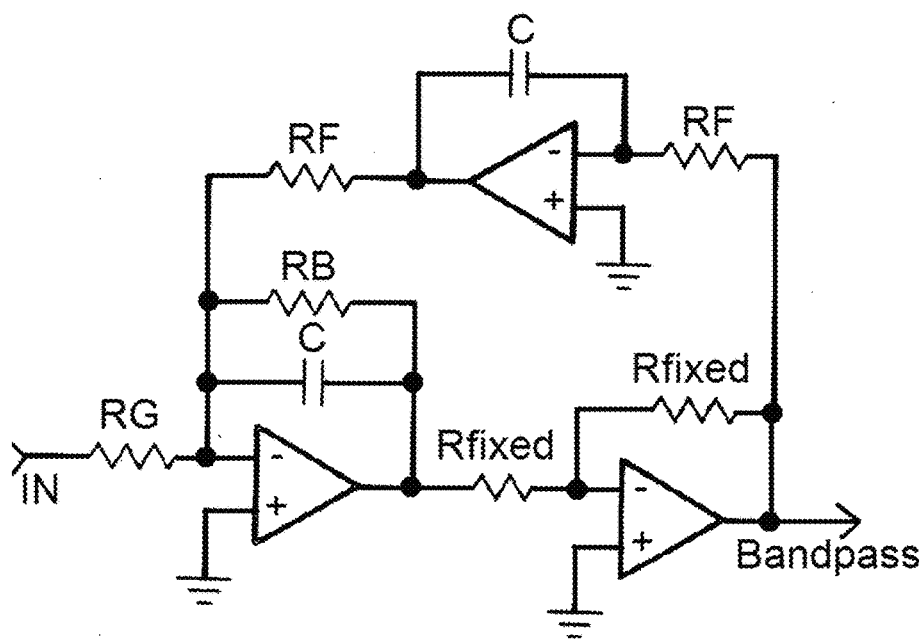
FIG. 12 shows a schematic of Biquad Active (Band Pass) Filter used to simulate performance of a stretchable materials.

FIG. 12 shows a schematic of a Biquad Active (Band Pass) Filter used by the inventors to determine the strain-dependent device performance using computational analysis. The strain-dependent performance of the conductive material was tested both as a resistor and capacitor and then used that information to simulate the device performance. The parameters by themselves are not necessarily noteworthy but the ability to tune center frequency, bandwidth, and gain by applying deformation is. This initial material set demonstrates the nominal characteristics and range of tuning that is possible with applied deformation.

Figure 13A:
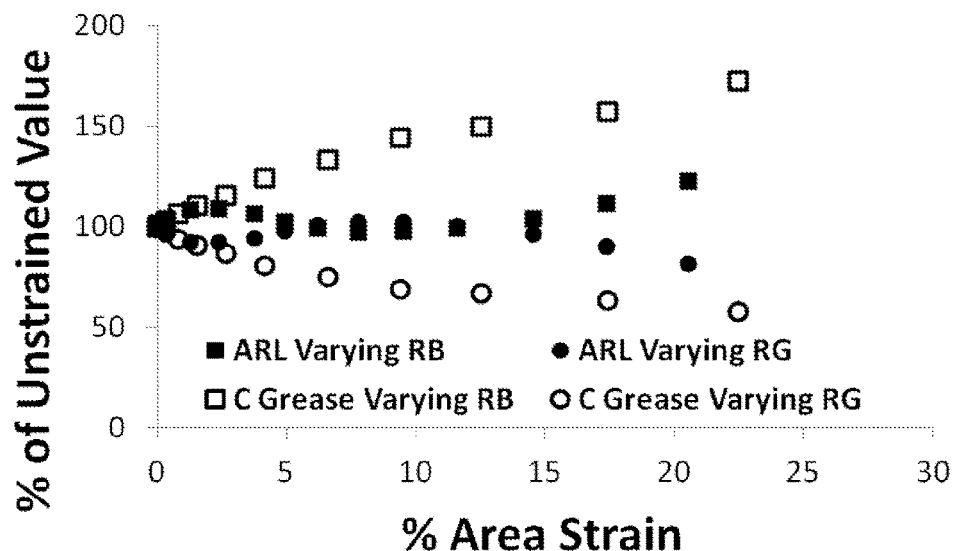
FIGS. 13A and 13B show a simulated device performance comparison in a band pass filter of components constructed using innovative conductive elastomers and carbon grease, respectively. The data demonstrates that band pass filters made using the innovative conductive elements will exhibit a smaller change in center frequency, bandwidth, and gain then the current SOA carbon grease indicating a more uniform performance regardless of strain state.
Figure 13B:
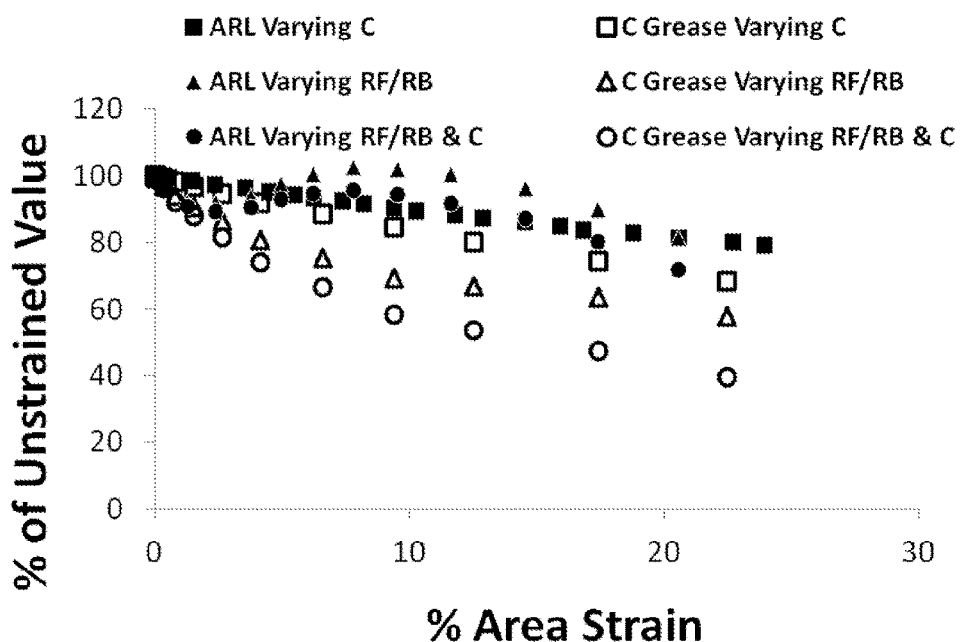

The strain-dependent capacitor and resistor data was used to compare simulated device performance in a band pass filter when using the innovative conductive elastomers and SOA carbon grease, respectively. FIGS. 13A and 13B show the results. The data demonstrates that band pass filters made using the innovative conductive elements will exhibit a smaller change in center frequency, bandwidth, and gain than the current SOA carbon grease indicating a more uniform performance regardless of strain state.

Example 2: Liquid Eutectic Metal (Gallium-Indium-Tin) and Nickel-Coated Carbon Fibers in a Poly(styrene-b-isoprene-b-styrene) Thermoplastic Elastomer Matrix Materials NCCF was used as-received from Sulzer Metco. Poly (styrene-b-isoprene-b-styrene) (SIS) 4111 was used as-received from Dexco Polymers. Galinstan, composed of 68.5% Gallium, 21.5% Indium, and 10% Tin, was used as-received from RG Medical Diagnostics (Wixom, Mich., USA). It has a melting temperature of −2.2° F. (19° C.).

Composite Production

The NCCF and Galinstan was mixed with the poly (styrene-b-isoprene-b-styrene) (SIS) 4111 using a DSM conical twin screw extruder (Geleen, Netherlands) at 200° C. and 50 rpm for 15 min. The final composition of the material was 15 vol % NCCF/25 vol % Galinstan/60 vol % 4111. The extrudate was then melt pressed at 160° C. and 20,000 lbf for 3 min to press it into a ribbon (approximately 1 cm wide×20 cm long×0.1 cm thick).

Conductivity as a Function of Elongation

The conductivity was measured using a four wire technique recording the resistance and distance between inner electrodes. The volume conductivity was determined from the reciprocal of the resistance normalized by the distance between the electrodes. Initial testing exhibited a conductivity of 15 S/cm that was maintained at 100% elongation demonstrating that liquid eutectic metal can be used to facilitate sliding contacts without the need for confinement in an etched channel. Further experiments are designed to reduce the filler content and increase the toughness of the resulting composite.

Example 3: Magnetic Field Orientation of Nickel-Coated Carbon Fibers in a Poly(styrene-b-ethylene-co-butylene-b-styrene)/Mineral Oil Thermoplastic Elastomer Gel Matrix Materials NCCF were used as-received from Sulzer Metco. Poly (styrene-b-ethylene-co-butylene-b-styrene) (SEBS) G1652 linear block copolymer was used as-received from Kraton Polymers (Houston, Tex., USA). Mineral oil was used as-received from VWR (Suwanee, Ga., USA).

Composite Production

SEBS and mineral oil were mixed and heated to 150° C. for 3 h in a ratio of 80% SEBS and 20% mineral oil while stirring occasionally to ensure uniform mixing. The NCCFs were added at 1 vol % and the mixture was mechanically stirred for 15 min at 150° C. Samples were placed between two glass slides with a 1 mm spacer to control the sample thickness. The sample was then placed on a single macro-structured magnet that was patterned with 3 mm spacing or sandwiched between two macrostructured magnets in an oven at 120° C. After 10 min, the pattern was completely formed and removed from the oven. The mineral oil was extracted from the composite gel by placing the sample in 1-butanol. The 1-butanol was replaced every 48 h. The extraction progress was monitored by measuring the sample mass loss. The extraction was considered complete when about 95% of the mineral oil was removed.

Magnetic Field Orientation and Patterning

Due to the anisotropic nature of the magnets used, the NCCF form a banded structure inside the elastomeric material.

Figure 14:
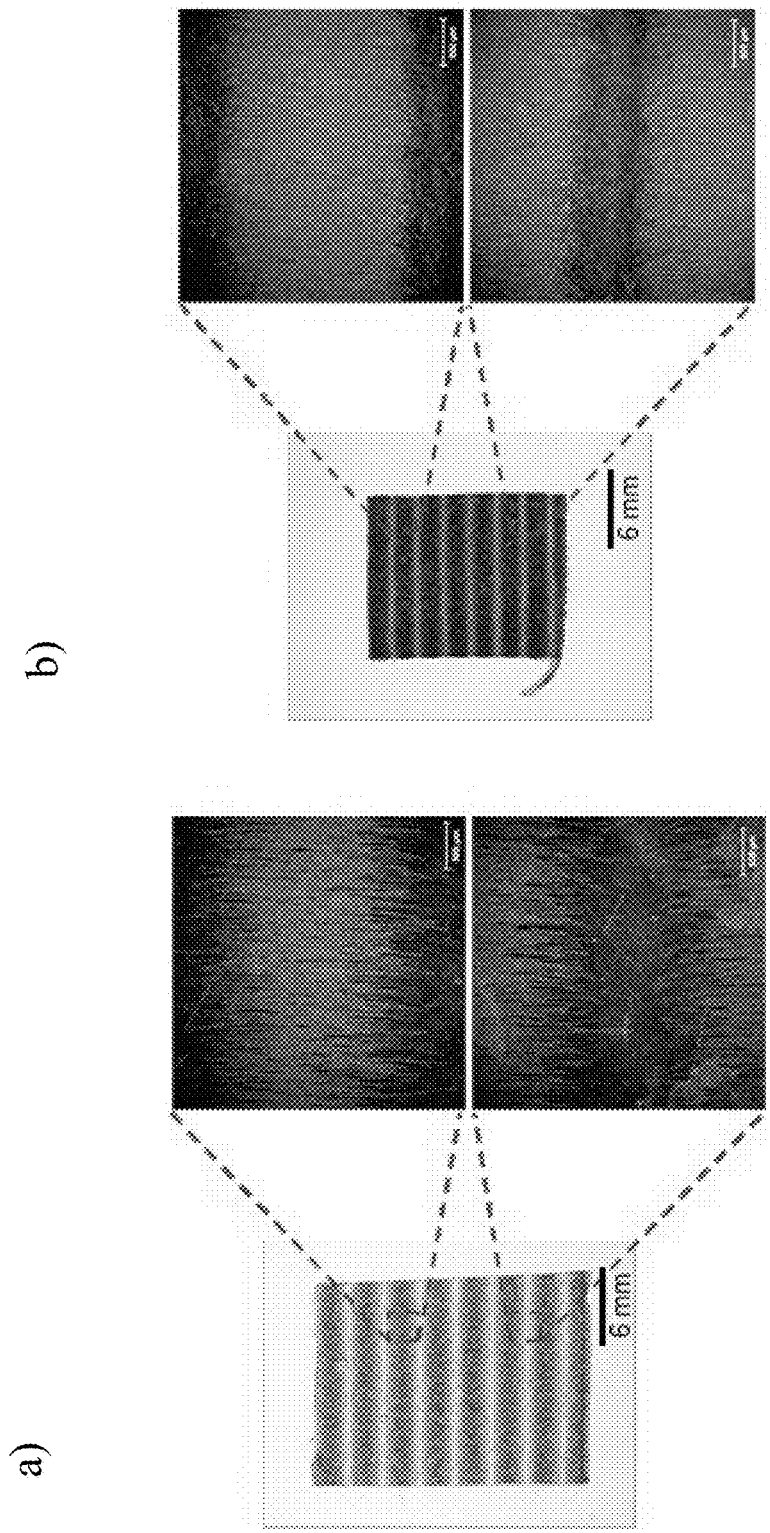
FIG. 14 includes pictures and optical microscope images of an 80% block copolymer/20 vol % mineral oil gel containing 1 vol % NCCF exposed to a macrostructured magnet a) before and b) after butanol extraction of the mineral oil.

FIG. 14 shows pictures and optical microscope images of an 80% block copolymer/20 vol % mineral oil gel containing 1 vol % NCCF exposed to a macrostructured magnet a) before and b) after butanol extraction of the mineral oil.

The NCCFs will align with the magnetic field lines of any magnet similar to ferrous metal filings. The magnet used here was composed of many magnets made up of several magnetic strips; there are several north and south poles spaced in sequence over the area of the magnet which produces this regular orientation pattern. If alternatively, a single bar magnet were to be used, for example, there would be a distribution of orientations related to the magnetic field lines (i.e. loops centered on either pole and ellipsoidal field lines in the center).

As produced, the structure does not have a measurable conductivity. However, upon removal of the mineral oil a measurable resistance of approximately 3 kΩ was obtained. It is anticipated that even lower resistances could be obtained by increasing the particle loading.

Figure 15:
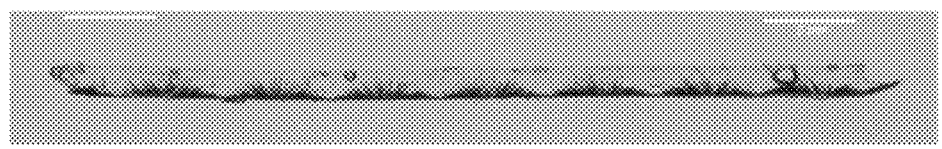
FIG. 15 shows cross-sectional pictures of an 80% block copolymer/20 vol % mineral oil gel containing 1 vol % NCCF a) placed on top of a macrostructured magnet and b) sandwiched between two macrostructured magnets.
Figure 15:

FIG. 15 shows cross-sectional pictures of an 80% block copolymer/20 vol % mineral oil gel containing 1 vol % NCCF a) placed on top of a macrostructured magnet and b)

sandwiched between two macrostructured magnets. In the case of a single magnet underneath the sample, all of the fibers are localized to one side creating embedded conductive pathways backed by an elastomer (FIG. 15a). When the sample, was sandwiched between two magnets, the particles orient normal to the film direction to produce conductivity through the film (FIG. 15b). The magnets used in the sandwich configuration were relatively weak resulting in some planar particle orientation due to gravity.

Example 4: Melt Processing of Poly(styrene-b-ethylene-co-butylene-b-styrene) (SEBS) G1652 containing Nickel-Coated Carbon Fiber (NCCF) and CerroTRU Eutectic Metal Materials NCCF were used as-received from Sulzer Metco. Poly(styrene-b-ethylene-co-butylene-b-styrene) (SEBS) G1652 was used as-received from Kraton Polymers. CerroTru is a eutectic metal alloy comprised of 58% Bismuth (Bi) and 42% Tin (Sn). It has a melting temperature of 281° F. (138.0° C.). The CerroTRU was purchased from McMaster Carr (Cleveland, Ohio, USA). The CerroTRU was heated above its melt temperature and separated into small droplets for melt processing.

Composite Production

SEBS, CerroTRU, and NCCF were loaded into a DSM Xplore extruder at 200° C. at 50 rpm. The material was re-circulated for 15 min before opening the extrusion port to produce a cylindrical extrudate with a diameter of about 4 mm.

SEM Analysis

The samples were fractured, potted in epoxy, and polished to observe the microstructure perpendicular to the extrusion direction.

Figure 16:
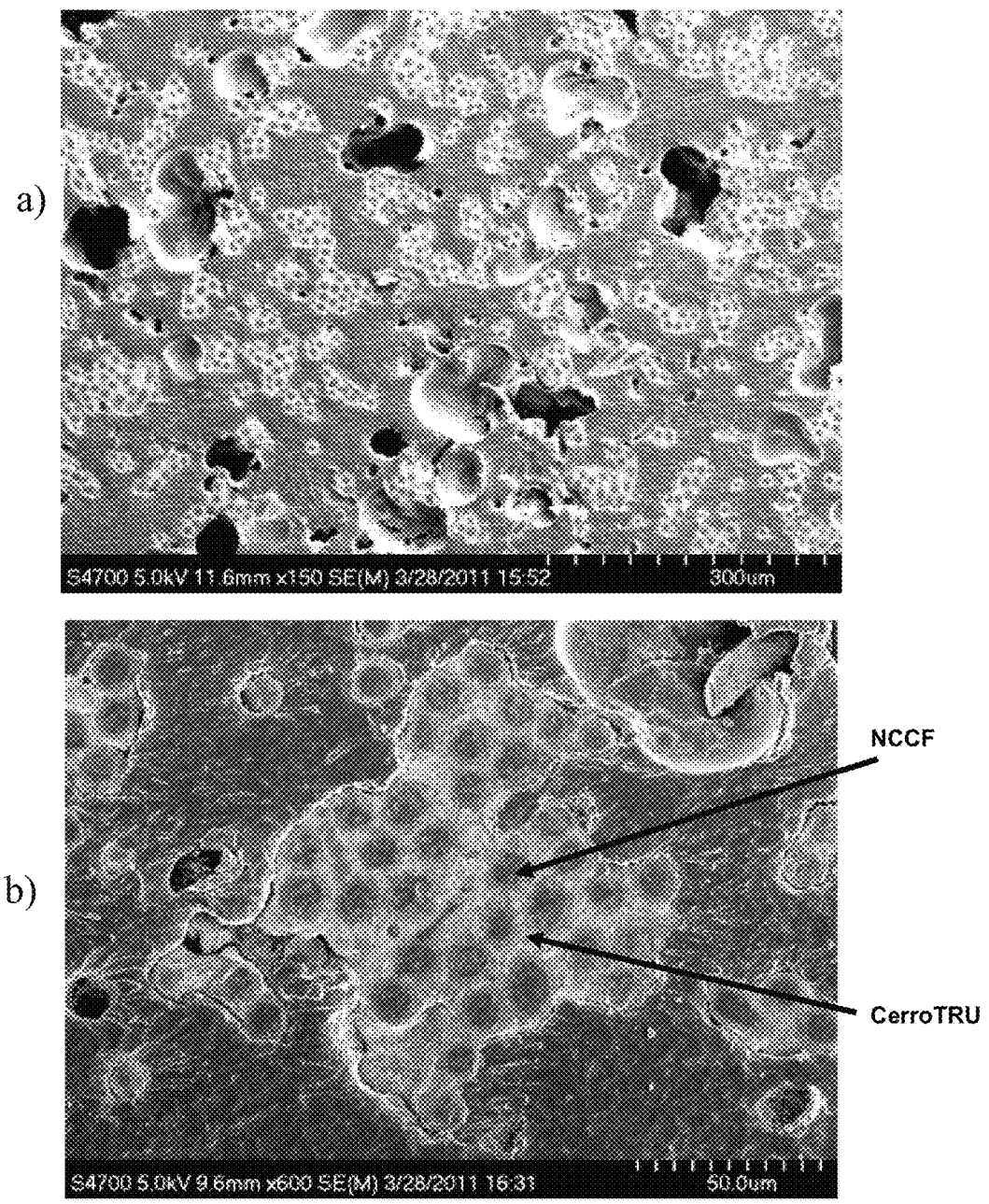
FIG. 16 shows SEM images of the 76 wt. % poly(styrene-b-ethylene-co-butylene-b-styrene) (SEBS)/10 wt. % CerroTRU (58% Bismuth/42% Tin)/14 wt. % NCCF composite obtained perpendicular to the extrusion direction demonstrating the orientation of the NCCF and the surrounding eutectic metal connection.

FIG. 16 shows SEM images of the 76 wt. % SEBS/10 wt. % CerroTRU/14 wt. % NCCF composite obtained perpendicular to the extrusion direction demonstrating the orientation of the NCCF and the surrounding eutectic metal connection. FIGS. 16(a) and 16(b) are images of the same sample at two different magnifications where FIG. 16(a) is at 150× and FIG. 16(b) is 600×.

The images depict a continuous polymer matrix with pockets of higher contrast. Within the higher contrast portions are circles of lower contrast. This microstructure is consistent with NCCF orientation in the direction of extrusion leading to a circular cross-section when observed perpendicular to the orientation/extrusion direction. Surrounding the individual fibers is a layer of CerroTRU eutectic that will enhance processing by allowing the particles to slide during processing and maintain electrical contact in the rigid composite after processing.

Electrical Conductivity

The conductivity was measured with a four-wire technique recording the resistance and distance between inner electrodes using a Keithley 2410 Sourcemeter. The volume conductivity was determined from the reciprocal of the resistance normalized by the distance between the electrodes.

Density Measurement

The density was measured using the "Archimedes Method" normalizing the sample mass to the sample volume measured by water displacement Conductivity vs Density The weight saving gained through by replacing a metallic component with a conductive polymer composite is a major aspect of their utility. However, the weight savings can be lost when a significant amount of particular filler is incorporated resulting in an increased density.

Figure 17:
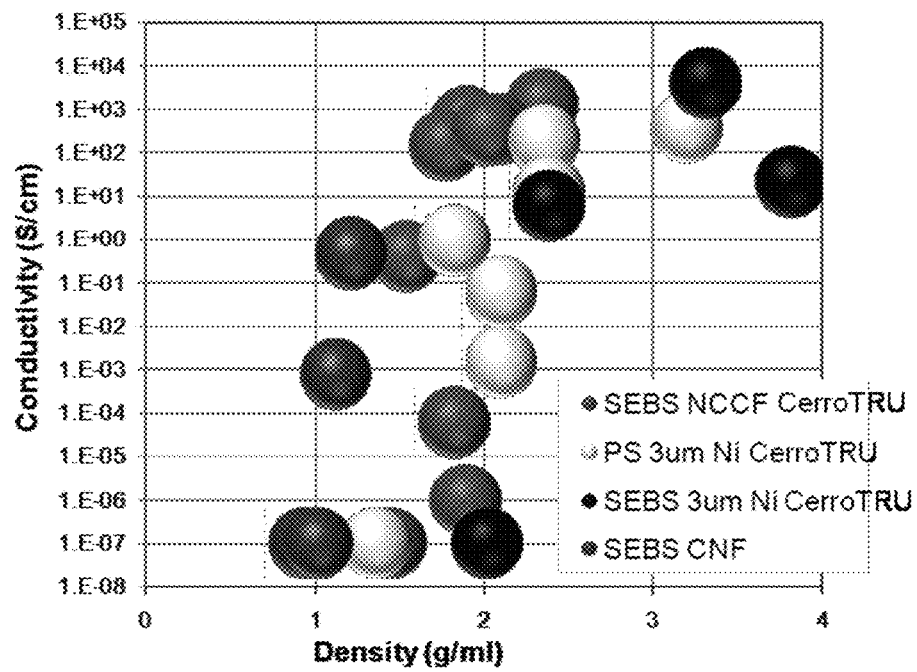
FIG. 17 is a plot comparing the conductivity as a function of composite density.

FIG. 17 is a plot comparing the conductivity as a function of composite density. The plot demonstrates the relationship of density to conductivity, an important performance parameter that enables practical utility. The state-of-the-art for low density conductive composites is the incorporation of carbon structures including carbon black, carbon fiber, carbon nanofiber, and carbon nanotubes. As can be observed in FIG. 13, the incorporation of carbon structures like carbon nanofiber (CNF) maintains a low density however the conductivity remains relatively low even at the highest loadings (1 S/cm). Previous work, discussed in Mrozek et al., "Highly conductive, melt processable polymer composites based on nickel and low melting eutectic metal," Polymer (2010) 51 2954-2958, utilized faceted, roughly spherical nickel along with CerroTRU to obtain high conductivity (i.e., above 100 S/cm) but required high loading particle loadings (10 wt % Nickel/50 wt % CerroTRU) resulting in a density of 3.3 g/mL. In contrast, by combining the high aspect ratio, non-entangled NCCF with a melt processing additive to promote sliding (i.e. CerroTRU) conductivity on the order of 10,000 S/cm were obtained at much lower loadings (14 wt % NCCF/10% CerrotTRU) leading to a density of 2.2 g/mL. The advantage of this invention is that it enables the development of particle-filled polymer composites that have a tunable strain-dependent electrical performance that is inherent to the material and does not require geometric patterning. For example, the composite materials would maintain electrical conductivity at large strains, or could exhibit a controlled increase or decrease in conductivity with increasing strain. These materials will enable a new class of electronic devices called "stretchable electronics" that are capable of undergoing large deformations (greater than 20% strain) while maintaining or providing controlled strain dependent device response.

Example 5: Melt Processing of Poly(styrene-b-ethylene-co-butylene-b-styrene) (SEBS) G1652 Containing Nickel-Coated Carbon Fiber (NCCF)

Materials

NCCF were used as-received from Sulzer Metco. Poly(styrene-b-ethylene-co-butylene-b-styrene) (SEBS) G1652 was used as-received from Kraton Polymers.

Composite Production

SEBS and NCCF were loaded at 30 vol % NCCF into a DSM Xplore extruder at 200° C. at 50 rpm. The material was re-circulated for 15 min before opening the extrusion port to produce a cylindrical extrudate with a diameter of about 4 mm. The extrudate was then melt pressed at 160° C. and 20,000 lbf for 3 min to press it into a rectangular bar (about 1 cm wide×4 cm long×0.4 cm thick).

Electrical Conductivity

The resistance was measured using a Keithley 2410 sourcemeter and two wire leads. The leads were normalized by connecting the two leads and zeroing the instrument.

Figure 18:
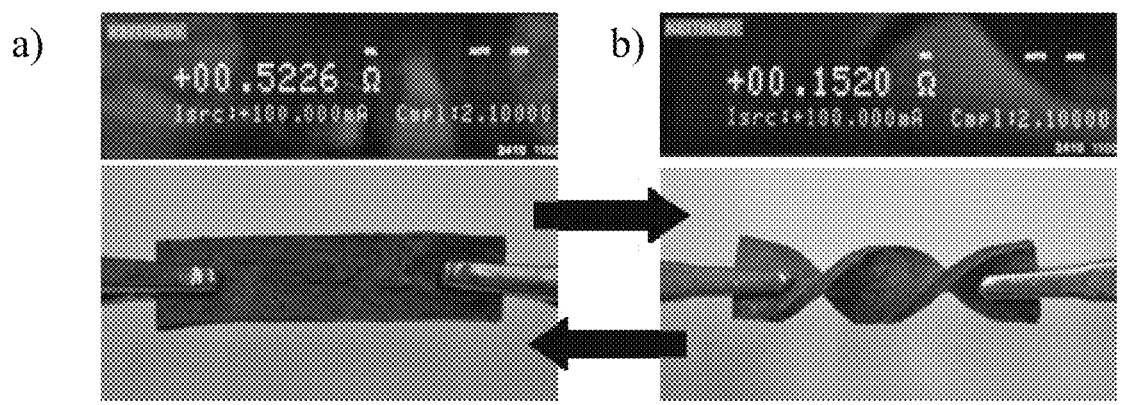
FIG. 18 shows photographs of a conductive composite consisting of poly(styrene-b-ethylene-co-butylene-b-styrene) containing 30 vol % nickel-coated carbon fiber connected to a Keithley 2410 sourcemeter undeformed and twisted 360°.

FIG. 18 shows the change in resistance upon twisting the material 360°. This demonstrates that the conductivity is maintained even during complex deformations like twisting. The decreased resistance upon deformation is attributed to delamination of the polymer from the particle surface leading to greater particle surface contacts.

This invention is designed to solve the lack of materials that exhibit uniform, controlled, and reproducible electrical performance as a function of strain. The development of these materials will enable a new class of "stretchable electronic devices" that can be used to replace traditional rigid electronics in applications where large one-dimensional, two-dimensional, and/or three-dimensional deformations are required to enhance their fieldability and broaden their implementation potential. Removing rigid components will also enable the integration of electronics into new platforms that were inaccessible previously. The invention provides a controlled electrical response that is inherent to the material and does not require geometric patterning. This avoids many of the issues of premature device failure, limited extensions, scale-up difficulties, and ruggedization. In addition, the inherent electrical performance allows for the production of a uniform sheet (i.e. no voids due to the geometric patterning). The inherent electrical properties allows for the production of large scale monolithic sheets required to realize many deformable capacitor, deformable battery, actuator, and energy harvesting designs.

Important aspects of the innovative technology include:

1) The ability to not only provide conductivity but control the electrical response during deformation. This includes decreasing, increasing, and maintained conductivity with increasing strain.

2) The mechanism to provide conductivity does not require geometric patterning. As a result, monolithic sheets can be produced enabling devices where the void space created as a result of geometric patterning hinders performance.

3) The methods for incorporating the electrical performance are scalable and can be accomplished through judicious selection of materials capable of commodity scale.

4) An increase in conductivity with increasing strain is realized. This allows for the development of materials where the rest state is an open circuit and the strain state increases electrical feedback. This has the potential to improve energy efficiency and is not currently addressed by other methods.

Moreover, the innovative technology provides solutions for various applications, including:

Unmanned Air and Ground Vehicles (UAVs/UGVs)—the incorporation of multi-functional polymer composites can reduce the size and/or weight of devices will enhance the capabilities of several classes of UAVs/UGVs.

Soft Robotics—the robotic platform must be compliant enough to move past an obstacle (i.e. under a door jam or through a crack in the wall) while regaining performance after passage or even maintain performance during deformation. The material requirements apply not only to the body of the robot but also any electronics or flexible sensors that provide information gathering capability, environmental recognition, and stimuli-responsiveness.

Soft Actuation/Dielectric Elastomer Actuators (DEAs)—maintained electrical performance during deformation up to several hundred percent would be applicable to soft actuators or artificial muscles that can provide mobility (i.e. walking, crawling, hopping, or flapping) or a change in shape (i.e. wing shape during flight to change trajectory). Dielectric elastomer actuators (DEA) are a common soft actuator design that consists of a dielectric elastomer between two parallel electrodes. Upon application of a voltage the plates are drawn together resulting in deformation of the elastomer. Currently, these applications are limited by the conductivity, changes in conductivity during deformation, and lack of compliance or commercially available products.

Stretchable Data/Power Transfer—Cables that are consistently flexed during operation are often engineered with redundant pathways to mitigate the inevitable breaking of the metallic connections. A stretchable cable would require far less redundancy potentially leading to additional applications. In addition, effective data/power transmission could be maintained at large elongations/deformations.

Deformable Conductive Couplers—A common failure point for many smart textiles is the connection of the device to the power supply or data line. A flexible conductive coupler would enhance the failure resistance of these connections. They also provide a robust transition point from highly conformable systems to more traditional rigid systems.

Stretchable Electromagnetic Shielding—The shielding efficiency to electromagnetic radiation is strongly dependent on the conductivity of the material. A highly conductive elastomer could be used to encapsulate a suspected package to prevent remote detonation by radio frequency.

Conductive Elastomeric Ink—enables the printing of stretchable electronic components onto highly deformable substrates. The current thermoplastic elastomer matrix is particularly well suited for ink development. Additive manufacturing techniques could also be employed to develop complex and space efficient 3-dimensional electronics.

Fieldable Electroencephalography (EEG) signal monitoring—monitoring device to determine cognitive states within an operational environment. Current systems are rigid and used metal tips electrodes to interface with the scalp that are not ballistically safe. Fabricating the EEG device from stretchable electronic materials would enable their implementation into the battlefield. As a side benefit, the stretchable conductive circuitry would fit any soldier regardless of head size or shape.

Electronic Textiles—integrate electronic devices into fabrics and personal protective equipment to:
  Provide accurate feedback on deformation/strain to determine fit/function of respirators—area of need from a 2010 DTRA respirator workshop
  Prevent musculoskeletal injury through integration into a conformal suit to be worn under the uniform—e.g. DARPA's Warrior Web program
  Enhanced injury diagnostics—provide information on the strain environment at the time of insult
  Soldier health monitoring—enable a rapid survey of the battlefield to prioritize medical resources Conformal Energy Storage—enables development of capacitors or batteries that will fit into unused and often irregular void space in many Army platforms Energy Harvesting—enhanced soft capacitor performance (similar to DEAs) can enhance current energy harvesting technology (e.g. heel strike technology) and enable harvesting higher strain movements (e.g. bending of the knee and elbow)

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

All patents, patent applications, articles and other references mentioned herein are hereby incorporated by reference in their entireties.

We claim:

1. A deformable elastomeric conductive material comprising:
   a monolithic elastomeric polymer matrix; and
   conductive filler material uniformly dispersed throughout the monolithic elastomeric polymer matrix which renders the material electrically or thermally conductive,
   wherein the conductive filler material comprises a plurality of straight and rigid nickel-coated carbon particles to enable adjacent particles to slide along each other without entanglement and remain in contact and/or in close proximity so as to maintain conductive pathways in the material such that the electrical conductivity of the material, when the material is subjected to deformation between 0 and 100% strain, remains substantially the same.

2. The material of claim 1, wherein the amount of particles in the elastomeric polymer matrix ranges from 0.01 to 50 vol %.

3. The material of claim 1, wherein the particles have an aspect ratio ranging from about 1.5 to 100,000.

4. The material of claim 1, wherein the particles are individually dispersed, dispersed in aggregate in bundles, or a combination thereof, in the elastomeric polymer matrix.

5. The material of claim 4, wherein the amount of particles in the bundles range from 3 to 500.

6. The material of claim 1, wherein the elastomeric polymer matrix is selected from the group consisting of: poly(styrene-b-isoprene-b-styrene), poly(styrene-b-ethylene-co-butylene-b-styrene), poly(styrene-b-butadiene-b-styrene), polybutadiene, natural rubber, silicone elastomer, epoxy elastomer, poly(propylene oxide) rubber, chloroprene, butyl elastomers, acrylonitrile butadiene styrene, butyl elastomer, and nitrile elastomer.

7. The material of claim 1, wherein the nickel-coated carbon particles of the conductive filler material are selected from the group consisting of: nickel-coated carbon fibers, nickel-coated graphite and nickel-coated carbon nanotubes.

8. The material of claim 1, further comprising solid additives uniformly dispersed in the elastomeric polymer matrix.

9. The material of claim 8, where the solid additives comprise $C_{60}$ "buckyballs" or conductive nickel spheres.

10. The material of claim 8, wherein the solid additives range from 1.5 nm to 500 μm in length or diameter.

11. The material of claim 8, wherein the amount of the solid additives ranges from about 0.5 volume percent to 50 volume percent.

12. The material of claim 1, further comprising at least one liquid additive.

13. The material of claim 12, wherein the amounts of the at least one liquid additive range from about 5 volume percent to about 80 volume percent.

14. The material of claim 1, wherein the nickel coated carbon particles comprise: nickel-coated carbon fibers which are approximately 10 μm in diameter and approximately 500 μm long.

15. The material of claim 1, wherein the conductivity of the material remains approximately 10 S/cm or more between 0 and 100% strain.

16. The material of claim 1, wherein the material behaves generally the same with respect to deformation in every direction.

17. The material of claim 1, wherein the material remains conductive in excess of 500% strain.

18. The material of claim 1, wherein the monolithic structure is formed of a melt processable thermoplastic material.

19. The material of claim 1, wherein the particles have magnetic properties and a predetermined orientation of particles in at least a portion of the material which is controllable with an external electric or magnetic field.

20. The material of claim 1, wherein the matrix with the conductive material dispersed within is produced as a monolithic sheet.

21. A deformable elastomeric conductive material comprising:
    a monolithic elastomeric polymer matrix;
    conductive filler material uniformly dispersed throughout the monolithic elastomeric polymer matrix which renders the material electrically or thermally conductive,
    wherein the conductive filler material comprises a plurality of straight and rigid particles to enable adjacent particles to slide along each other without entanglement and remain in contact and/or in close proximity so as to maintain conductive pathways in the material such that the electrical conductivity of the material, when the material is subjected to deformation between 0 and 100% strain, remains substantially the same; and
    a room temperature liquid eutectic metal alloy or an ionic liquid.

22. The material of claim 21, wherein the liquid eutectic metal alloy comprises Gallium/Indium or Gallium/Indium/Tin.

23. The material of claim 21, wherein the ionic liquid comprises 1-ethyl-3-methylimidazolium chloride, 1-ethyl-3-methylimidazolium tetrafluoroborate, 1-butyl-3-methylimidazolium hexafluorophosphate, 1-butyl-3-methylimidazolium chloride, 1-alkylpyridinium chloride, or N-methyl-N-alkylpyrrolidinium hexafluorophosphate).

24. A deformable elastomeric conductive material comprising:
    a matrix formed of an elastic polymer; and
    conductive filler material uniformly dispersed throughout the matrix which renders the material electrically or thermally conductive,
    wherein the matrix with the dispersed conductive filler material is uniformly formed without voids, and
    wherein the conductive filler material comprises a plurality of straight and rigid nickel-coated carbon particles to enable adjacent particles to slide along each other without entanglement and remain in contact and/or in close proximity so as to maintain conductive pathways in the material such that the electrical conductivity of the material, when the material is subjected to deformation between 0 and 100% strain, remains substantially the same.

* * * * *